D. A. JOHNSON.

Assignor of part interest to J. F. Pray & C. H. Kendall.

ATTACHING HUBS TO AXLES.

No. 7,549. Reissued March 6, 1877.

Witnesses,
W. J. Cambridge
J. E. Cambridge

Inventor,
Daniel A. Johnson,
Per Heschemacher & Stearns,
Attorneys.

N. PETERS, PHOTO-LITHOGRAPHER, WASHINGTON, D. C.

UNITED STATES PATENT OFFICE.

DANIEL A. JOHNSON, OF BOSTON, MASSACHUSETTS, ASSIGNOR OF PART INTEREST TO JOSEPH F. PRAY AND CHARLES H. KENDALL.

IMPROVEMENT IN ATTACHING HUBS TO AXLES.

Specification forming part of Letters Patent No. 147,503, dated February 17, 1874; reissue No. 7,549, dated March 6, 1877; application filed February 9, 1877.

*To all whom it may concern:*

Be it known that I, DANIEL A. JOHNSON, of Boston, in the county of Suffolk and State of Massachusetts, have invented certain Improvements in Securing Wheels to their Axles, of which the following is a full, clear, and exact description, reference being had to the accompanying drawings, making part of this specification, in which—

Figure 1:
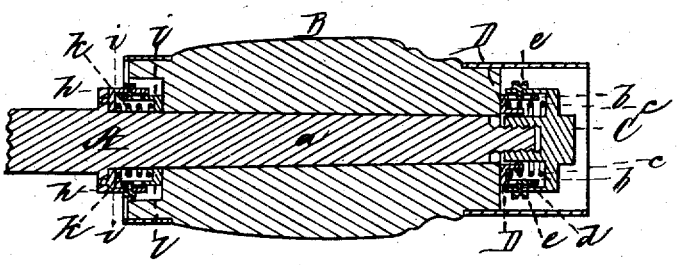
Figures 2, 3, 4:
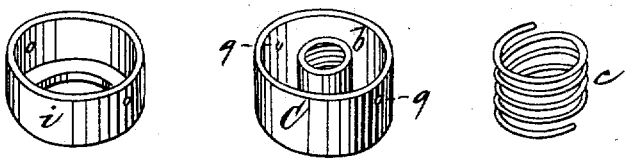

Figure 1 is a longitudinal central section through the hub of a carriage-wheel and its axle, with my improvements applied thereto. Fig. 2 is a perspective view of one of the spiral springs which I employ. Fig. 3 is a perspective view of the fastening-nut adapted to receive the said spring. Fig. 4 is a perspective view of a cup-shaped ring to be applied to the inner end of the axle, and adapted to receive a spring similar to that placed within the fastening-nut.

My present invention relates to that method of securing wheels to their axles in which one or more springs are employed to prevent rattling; and consists in so applying a spring or springs to a carriage-axle as to secure a bearing for the journal along the whole or the greater portion of its length, which is not the case where the spring or springs are placed within the axle-box around the journal, as heretofore, the latter method materially reducing the length and consequent amount of the bearing-surface, and causing the rapid wear of the parts.

To enable others skilled in the art to understand and use my invention, I will proceed to describe the manner in which I have carried it out.

In the said drawings, A represents a carriage-axle, upon the journal *a* of which revolves the wheel-hub B, which is intended to be provided with a suitable axle-box. (Not shown.) At the outer end of the journal is a screw-thread, over which is turned the fastening-nut C, within which is formed an annular recess, *b*, for the reception of a spiral spring, *c*, which is thus inclosed within the nut, and serves to prevent concussion and rattling. Between the spring *c* and the hub B is interposed a washer, D, having a flange, *d*, provided with slots for the reception of screws *e*, which pass through holes *g* in the side of the nut C, by which construction the nut and washer are caused to revolve together, while the nut is free to move independently of the washer in a longitudinal direction, to allow of the compression and expansion of the spring. Over the inner end of the axle, and bearing against the collar *h* formed thereon, is fitted a cup-shaped ring, *i*, within which is placed a spiral spring, *k*, similar to that inclosed within the nut C, a washer, *l*, similar to that, D, being interposed between the inner end of the hub B and the spring *k*, the cup-shaped ring *i* and washer *l* being connected in the same manner as the nut C and washer D, the springs *c* and *k* serving to effectually prevent the concussion and rattling ordinarily produced by the longitudinal play of the axle within its box. These washers D and *l* may, however, be dispensed with, if desired.

It will be seen that the cup-shaped ring *i* and nut C, with their springs *k* and *c*, may be readily applied to an ordinary axle without changing its construction or that of its axle-box. By thus placing the spring *c* within the nut C, and the spring *k* within the ring *i*, a bearing is secured for the journal along the whole or the greater portion of its length, thus preventing the rapid wear which occurs where the bearing-surface is shortened and reduced by locating the springs within the axle-box, as heretofore.

What I claim as my invention, and desire to secure by Letters Patent, is—

1. The spring *c*, placed within the fastening-nut C, in combination with and applied to the outer end of an axle, substantially in the manner and for the purpose set forth.

2. The cup-shaped ring *i*, and the spring *k* placed therein, in combination with and applied to the inner end of an axle, substantially as and for the purpose described.

Witness my hand this 13th day of January, A. D. 1877.

DANIEL A. JOHNSON.

In presence of—
P. E. TESCHEMACHER,
N. W. STEARNS.